Jan. 10, 1950     A. SOLDANI     2,494,455

SCRAPER

Filed Aug. 2, 1945

INVENTOR.
ALBERT SOLDANI
BY
Charles R. Fay
atty

Patented Jan. 10, 1950

2,494,455

UNITED STATES PATENT OFFICE 2,494,455

SCRAPER

Albert Soldani, Southbridge, Mass., assignor to Hyde Manufacturing Company, Southbridge, Mass., a corporation of Massachusetts Application August 2, 1945, Serial No. 608,424

1 Claim. (Cl. 30—171)

This invention relates to scrapers of the type having a removable reversible blade.

Objects of the invention include the provision of a scraper having a body and means to clamp a removable blade thereto at the underside thereof so that use of the scraper tends to force the blade against the body as a fixed clamping jaw therefor, rather than against a movable jaw as in the prior art, and also, leaving the top side of the body free and unencumbered for facility in manual operation of the scraper; and the provision of a movable clamping jaw for the blade together with easily and quickly operated manual means to draw the movable jaw up into clamping engagement with the blade.

Other objects and advantages of the invention will appear hereinafter.

Reference is to be had to the accompanying drawings, in which

Figure 1:
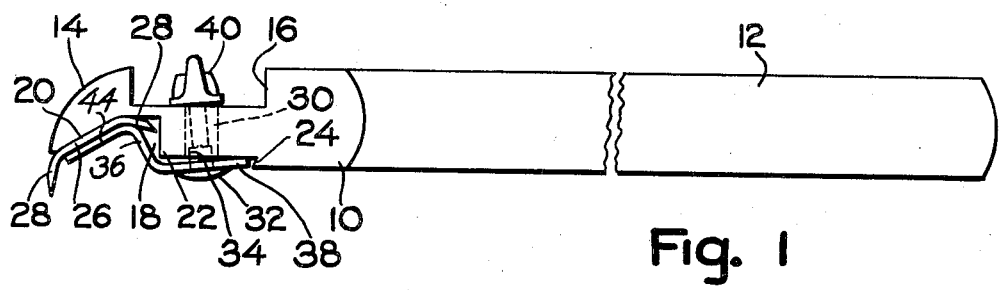
Fig. 1 is a view in side elevation.
Figure 2:
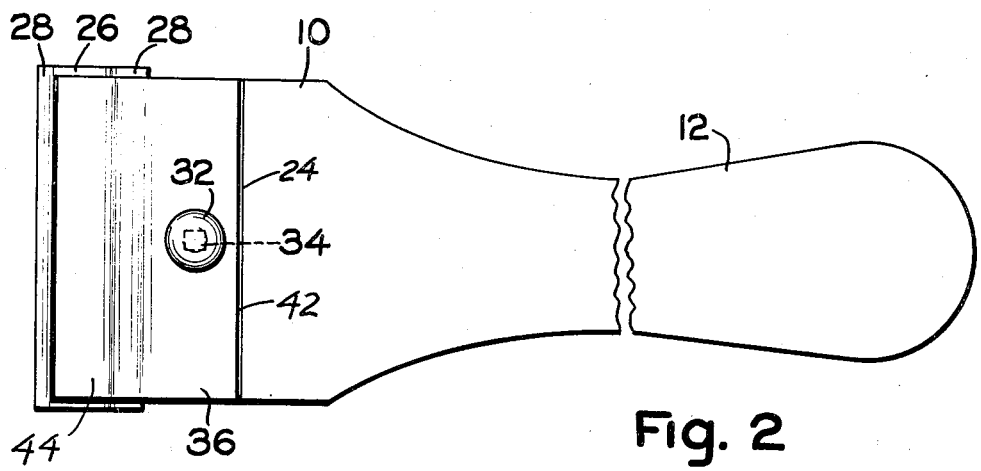
Fig. 2 is a bottom plan view.
Figure 3:
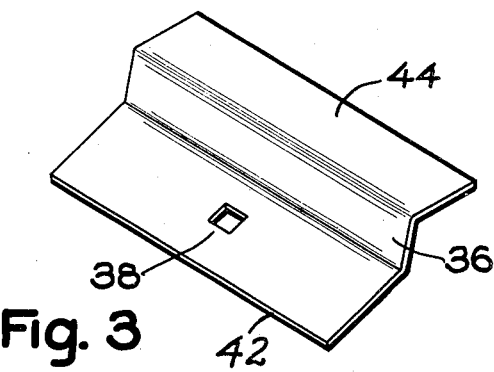
Fig. 3 is a perspective view of the movable clamping jaw.

As shown in the drawings for the purpose of illustrating the invention, there is provided a scraper body 10 having a handle 12, the body and handle being made of any convenient material such as wood. The forward end of the body is provided with a curved edge 14, and to the rear of this edge at the top of the scraper body there is a transverse slot or recess 16 parallel with the curved edge.

Below the edge 14 there is another transverse slot 18 having a surface 20 thereof inclined upwardly to the rear as shown in Fig. 1, slot 18 then extending rearwardly for a short distance and vertically down to a point 22. From the point 22 the recess extends straight and rearwardly to form a shallow shoulder 24 having an undercut as clearly shown.

The recess 18 is adapted to reversibly receive a blade 26 formed of flat stock and having a pair of sharpened side flanges 28 extending approximately at 45° to the body of the blade. One flange extends into cutting or scraping position, and the other is nested in the recess for use upon reversal of the blade. The body of the blade lies flatly against surface 20, the latter acting as a fixed clamping jaw therefor.

There is an aperture 30 connecting the two recesses for the reception of a fastener such as a carriage bolt 32 having a square shank 34. The square shank fits a square aperture 38 in a clamping plate 36 so as to prevent turning, and a nut 40 in slot 16 is used to draw the clamping plate to clamp the blade. The plate 36 has a straight edge 42 abutting shoulder 24 to maintain the plate in correct alinement, and the plate generally follows the contour of both the blade and recess 18, terminating in a portion 44 contacting and clamping the blade.

It will be seen from the disclosure herein that this invention provides a simple and easily and cheaply manufactured scraper comprising merely a body, a pressed metal movable jaw, a bolt, and a blade, in which the movable jaw is always held in correct position by the shape of the body. Also, the blade is quickly and easily released by the fingers of the user by backing off nut 40 and the blade is as easily and quickly reclamped by turning up on the nut, no tools being needed and only ordinary strength and no skill being used to change or reverse the blade.

Having thus described my invention and the advantages thereof, I do not wish to be limited to the details herein disclosed, otherwise than as set forth in the claim, but what I claim is:

A scraper comprising a body having a forward blade-holding end and a rearward handle end, an upward and rearward inclined blade-clamping surface at the forward end of the body, a loose plate forming a movable blade clamping jaw; said plate being of elongated Z-form having a pair of spaced joined plane non-parallel portions, one of which clamps the blade and the other of which contacts the undersurface of the body, and a fastener connected to the plate and passing through the body for drawing the plate to the inclined blade clamping surface.

ALBERT SOLDANI.

REFERENCES CITED

The following references are of record in the file of this patent:

UNITED STATES PATENTS

| Number | Name | Date |
|---|---|---|
| 2,317,041 | Erickson | Apr. 20, 1943 |
| 2,347,473 | Erickson | Apr. 25, 1944 |

FOREIGN PATENTS

| Number | Country | Date |
|---|---|---|
| 48,924 | Switzerland | Oct. 12, 1909 |